United States Patent
Sen et al.

(10) Patent No.: US 12,510,986 B1
(45) Date of Patent: Dec. 30, 2025

(54) SYSTEM AND METHOD FOR TOUCH-BASED DATA COMMUNICATION USING HUMAN BODY

(71) Applicant: Quasistatics Inc., West Lafayette, IN (US)

(72) Inventors: Shreyas Sen, West Lafayette, IN (US); Arunashish Datta, West Lafayette, IN (US)

(73) Assignee: Quasistatics Inc., West Lafayette, IN (US)

( * ) Notice: Subject to any disclaimer, the term of this patent is extended or adjusted under 35 U.S.C. 154(b) by 0 days.

(21) Appl. No.: 18/806,753

(22) Filed: Aug. 16, 2024

(51) Int. Cl.
*G06F 3/041* (2006.01)
*G06F 3/044* (2006.01)

(52) U.S. Cl.
CPC .......... *G06F 3/04162* (2019.05); *G06F 3/044* (2013.01); *G06F 2203/04107* (2013.01)

(58) Field of Classification Search
CPC ................. G06F 3/04162; G06F 3/044; G06F 2203/04107
See application file for complete search history.

(56) References Cited

U.S. PATENT DOCUMENTS

2020/0110482 A1\* 4/2020 Vu ............................. H04L 9/38
2021/0258080 A1\* 8/2021 Sen .......................... H04B 5/22

\* cited by examiner

*Primary Examiner* — Yaron Cohen
(74) *Attorney, Agent, or Firm* — Kevin J Fournier Intellectual Property Legal Services Ltd.; Kevin J Fournier

(57) ABSTRACT

A system and method for touch-based data communication using human body is disclosed. The present system provides touch-based data communication using a human body. The human body is used as a conducting medium for establishing a communication channel between plurality of communicating devices. The system includes an Electro-Quasistatic Human Body Communication (EQS-HBC) transmitter configured to send data signals to the one or more external devices through a human body based on the detected touch input. An EQS-HBC receiver is configured to receive data signals from the one or more external devices 104 through the human body based on the detected touch input. Further, the system includes a ground plane integrated within the touchscreen interface for acting as a ground electrode.

18 Claims, 14 Drawing Sheets

SYSTEM AND METHOD FOR TOUCH-BASED DATA COMMUNICATION USING HUMAN BODY

FIELD OF INVENTION

Embodiments of the present disclosure relate to the field of communication between communicating devices and more particularly relates to a system for touch-based data communication using human body.

BACKGROUND

Generally, a touchscreen technology has become the most popular information input methodology from humans to machine due to convenience and versatility of the technology. The touchscreen technology has been used in wearable devices as well as larger systems such as kiosks in Point of Sale (POS) systems and in general-purpose information systems. The application of touch screen technology has increased manifold with more number wearable devices updating their interfaces with touch screen technology. Current touchscreen technology is used to detect and locate the position of touch events with the action of touch being the only input to the system.

Conventionally, the touch screen technology is configured to detect and locate the position of touch. However, the touch screen technology is not configured to establish communication of plurality of wearable devices with plurality of larger systems such as kiosks in POS, touch screen laptops, touch screen mobile devices, and the like. Traditionally available data communication technologies fail to transfer data with high speed. Further, these technologies are not capable of transferring data at low Signal to Noise Ratio and high channel capacity. Wireless technologies for data transfer further fail to transfer data of large size and fail to transfer data at higher data rate. The low data rates of less than 1 kbps severely lower the impact of communication and limits the applications of such a technology. Further, these technologies also suffer data inefficiency due to high communication losses.

Hence, there is a need for an advanced systems and methods for touch-based data communication using human body, in order to address the aforementioned issues.

SUMMARY

This summary is provided to introduce a selection of concepts, in a simple manner which is further described in the detailed description of the disclosure. This summary is neither intended to identify key or essential inventive concepts of the subject matter nor to determine the scope of the disclosure.

In accordance with an embodiment of the present disclosure, a system for touch-based data communication using human body is disclosed. The system includes a touchscreen interface, a data communication module communicatively coupled to the touchscreen interface, and a ground plane. Further, the touchscreen interface includes a capacitive touch sensing layer configured to detect touch input within surface area of the touchscreen interface, at least one electrode positioned at one or more edges of the capacitive touch sensing layer. The at least one electrode is configured to maximize a field strength captured during data transmission. Further, the data communication module includes an Electro-Quasistatic Human Body Communication (EQS-HBC) transmitter configured to establish a communication channel with one or more external devices using human body network. Further, the Electro-Quasistatic Human Body Communication (EQS-HBC) transmitter is configured to send data signals to the one or more external devices through a human body based on the detected touch input. Further, the data signals may include, but not limited to, audio, image, video, transactions in Point of Sale (POS) system, personalized data, and the like. Further, the data communication module includes an EQS-HBC receiver connected to the at least one electrode and a system ground of the touch-based system. The EQS-HBC receiver is configured to receive data signals from the one or more external devices through the human body based on the detected touch input. Further, the system includes a ground plane integrated within the touchscreen interface for acting as a ground electrode.

Further, a method for touch-based data communication using a human body is disclosed. Further, the method includes detecting a touch input within surface area of the touchscreen interface. Further, the method includes capturing electric field strength produced at the surface area of the touchscreen interface upon detecting the touch input. Further, the method includes establishing a communication channel with one or more external devices using human body network. Further, the method includes transferring data signals between one or more external devices and the touch-based system through a human body network based on the detected touch input.

Further, in another aspect of the embodiment of the present disclosure the system includes a non-transitory computer-readable medium including machine-readable instructions that are executable by a processor to detect a touch input within surface area of the touchscreen interface. Further, the processor is configured to capture electric field strength produced at the surface area of the touchscreen interface upon detecting the touch input. Further, the processor is configured to establish a communication channel with one or more external devices using human body network. Further, the processor is configured to transfer data signals between one or more external devices and the touch-based system through a human body network based on the detected touch input. Further, the processor is configured to determine an operation to be performed on the touch screen interface based on the detected touch input. Further, the processor is configured to switch between one of a touch sensing mode and a data communication mode based on the determined operation to be performed. Further, the processor is configured to perform at least one of transferring the data to the one or more external devices and sensing the touch inputs based on mode of operation.

BRIEF DESCRIPTION OF DRAWINGS

The disclosure will be described and explained with additional specificity and detail with the accompanying figures in which.

Figure 1A:
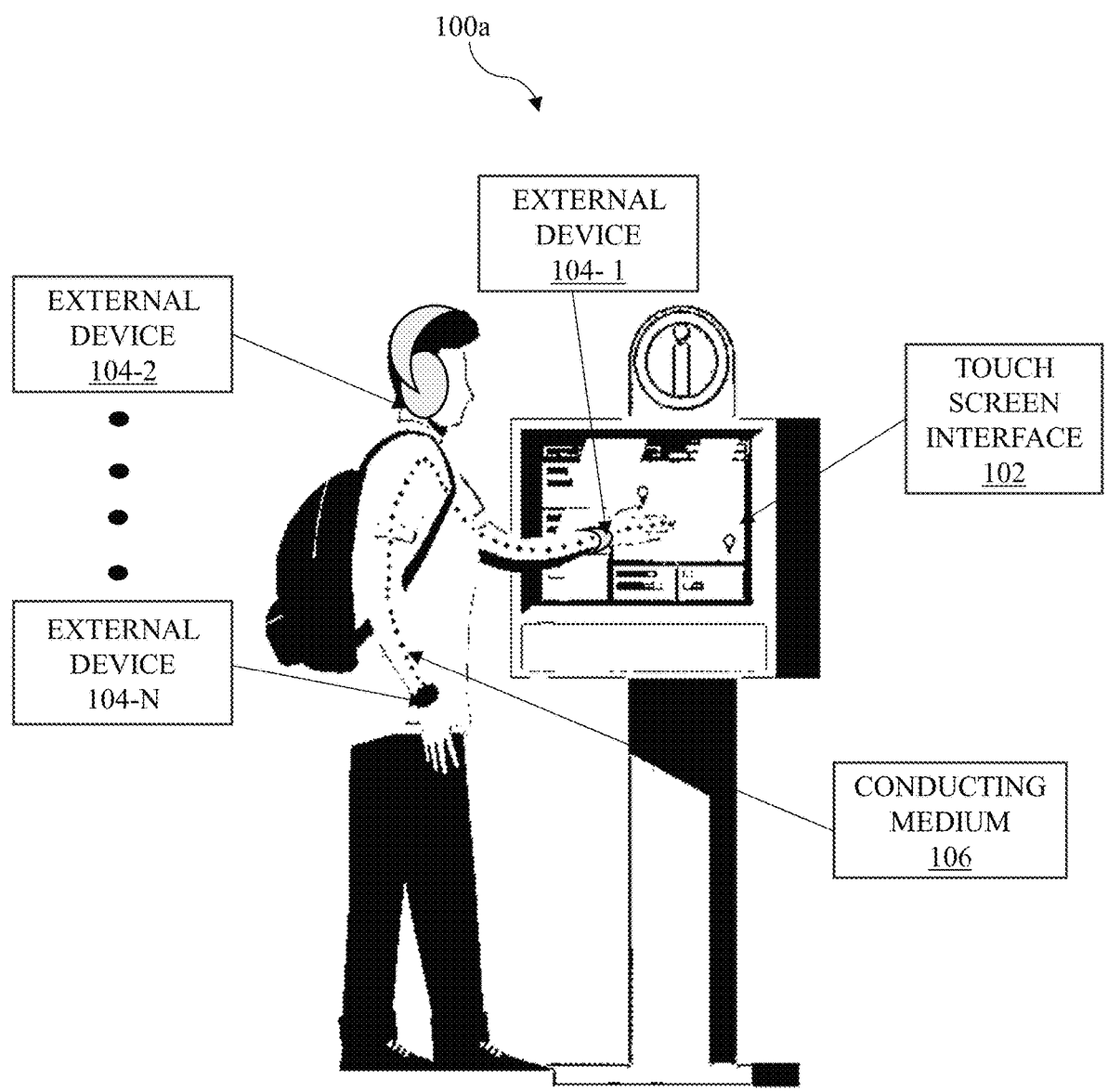
FIG. 1A-B illustrates a schematic diagram representation of an exemplary touch-based system for data communication using human body, in accordance with an embodiment of the present disclosure.

Further, those skilled in the art will appreciate that elements in the figures are illustrated for simplicity and may not have necessarily been drawn to scale. Furthermore, in terms of the construction of the device, one or more components of the device may have been represented in the figures by conventional symbols, and the figures may show only those specific details that are pertinent to understanding the embodiments of the present disclosure so as not to obscure the figures with details that will be readily apparent to those skilled in the art having the benefit of the description herein.

DETAILED DESCRIPTION OF THE DISCLOSURE

For the purpose of promoting an understanding of the principles of the disclosure, reference will now be made to the embodiment illustrated in the figures and specific language will be used to describe them. It will nevertheless be understood that no limitation of the scope of the disclosure is thereby intended. Such alterations and further modifications in the illustrated system, and such further applications of the principles of the disclosure as would normally occur to those skilled in the art are to be construed as being within the scope of the present disclosure. It will be understood by those skilled in the art that the foregoing general description and the following detailed description are exemplary and explanatory of the disclosure and are not intended to be restrictive thereof.

In the present document, the word "exemplary" is used herein to mean "serving as an example, instance, or illustration." Any embodiment or implementation of the present subject matter described herein as "exemplary" is not necessarily to be construed as preferred or advantageous over other embodiments.

The terms "comprise", "comprising", or any other variations thereof, are intended to cover a non-exclusive inclusion, such that one or more devices or sub-systems or elements or structures or components preceded by "comprises . . . a" does not, without more constraints, preclude the existence of other devices, sub-systems, additional sub-modules. Appearances of the phrase "in an embodiment", "in another embodiment" and similar language throughout this specification may, but not necessarily do, all refer to the same embodiment.

Unless otherwise defined, all technical and scientific terms used herein have the same meaning as commonly understood by those skilled in the art to which this disclosure belongs. The system, methods, and examples provided herein are only illustrative and not intended to be limiting.

A computer system (standalone, client or server computer system) is configured by an application may constitute a "module" (or "subsystem") that is configured and operated to perform certain operations. In one embodiment, the "module" or "subsystem" may be implemented mechanically or electronically, so a module includes dedicated circuitry or logic that is permanently configured (within a special-purpose processor) to perform certain operations. In another embodiment, a "module" or "subsystem" may also comprise programmable logic or circuitry (as encompassed within a general-purpose processor or other programmable processor) that is temporarily configured by software to perform certain operations.

Accordingly, the term "module" or "subsystem" should be understood to encompass a tangible entity, be that an entity that is physically constructed permanently configured (hardwired) or temporarily configured (programmed) to operate in a certain manner and/or to perform certain operations described herein.

Figure 1B:
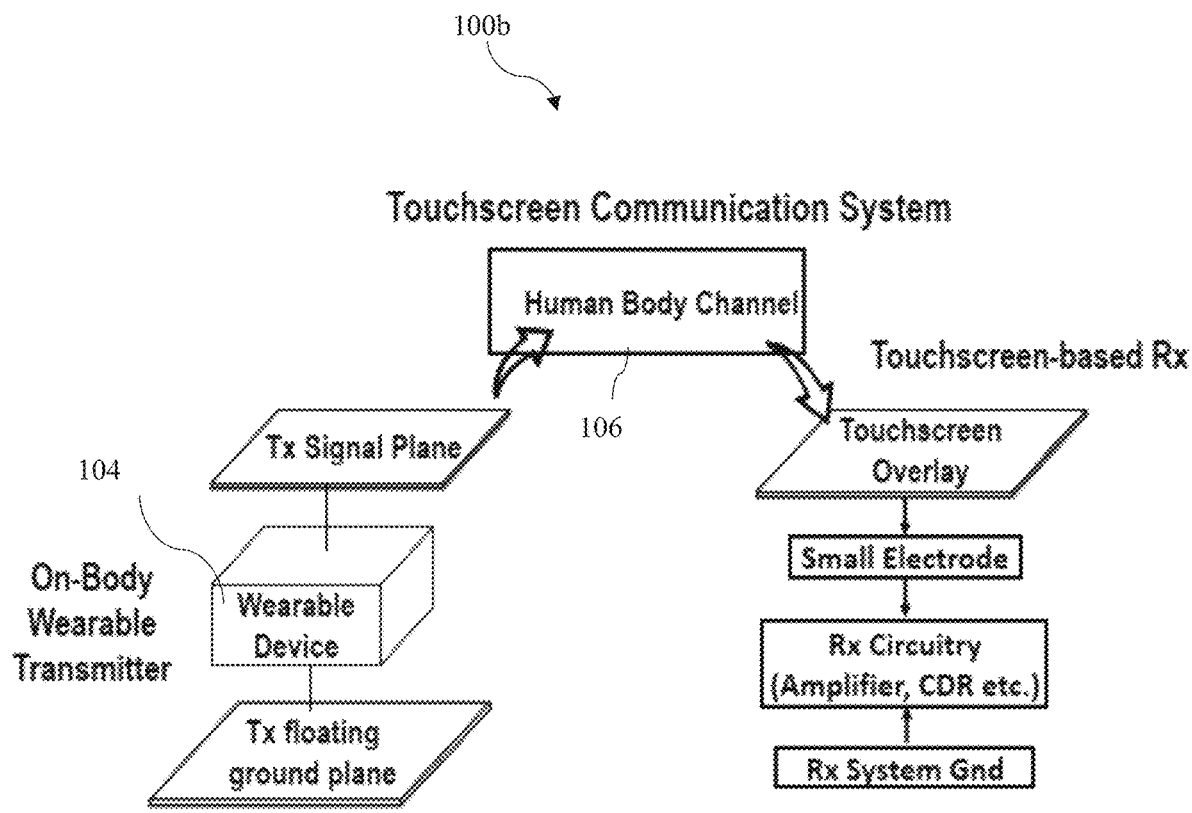
Figure 13:
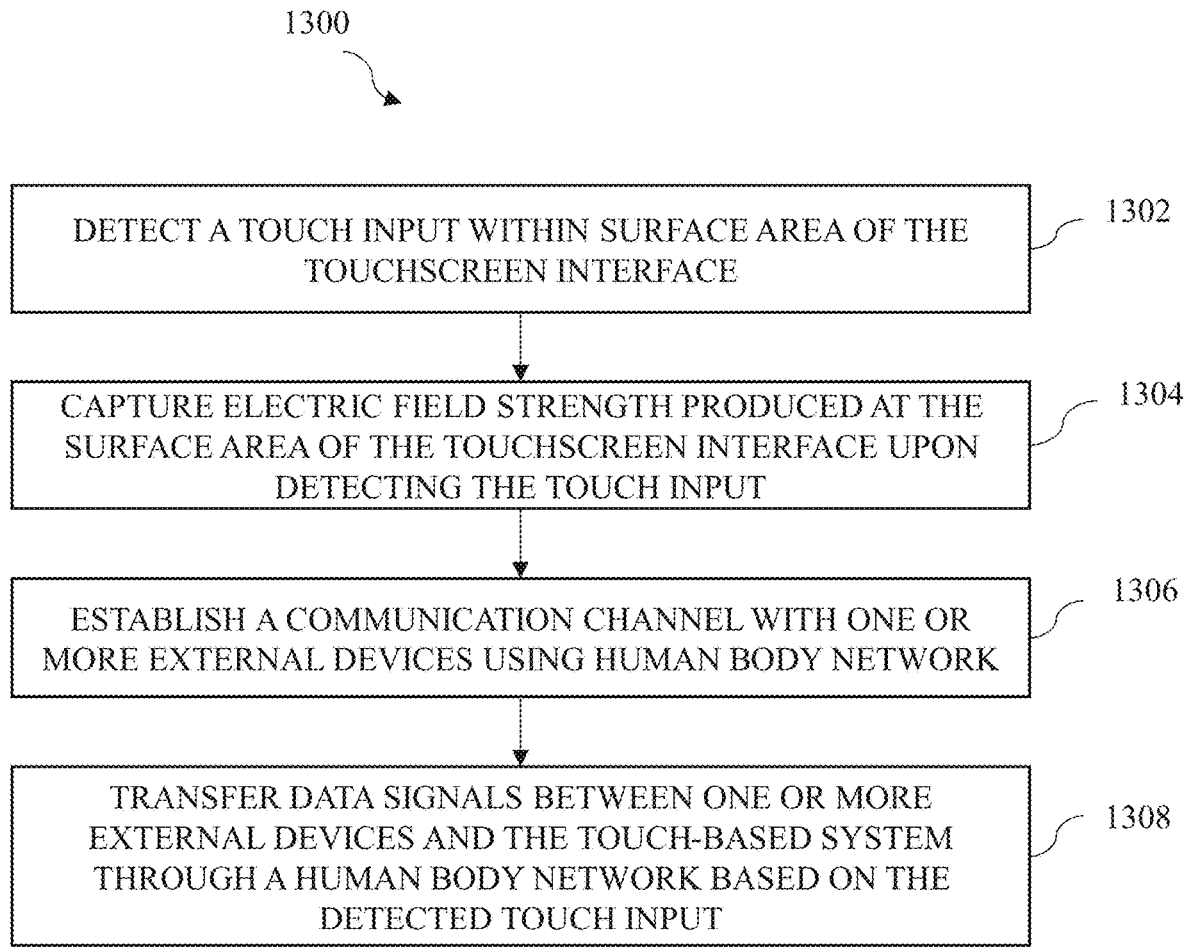
FIG. 13 illustrates a process flow diagram of an exemplary a method for communicating data between devices and a touch-based system using a human body, in accordance with another embodiment of the present disclosure.

Referring now to the drawings, and more particularly to FIG. 1A-B through FIG. 13, where similar reference characters denote corresponding features consistently throughout the figures, there are shown preferred embodiments and these embodiments are described in the context of the following exemplary system and/or method.

FIG. 1A-B illustrates a schematic diagram representation of an exemplary a touch-based system 100 for data communication using human body, in accordance with an embodiment of the present disclosure.

According to FIG. 1A, the touch-based system 100 may include, but not limited to, a touch screen interface 102, one or more external devices 104-1, . . . , 104-N (hereinafter referred as one or more external devices 104), a conducting medium 106, and a ground plane (not shown). Further, the touch screen interface 102 may include a surface capacitive touch screen interface, and the like. Further, the touch screen interface 102 may include, but not limited to, a mobile device, a smart phone, a tablet computer, a digital camera, a laptop computer, a desktop computer, an Automated Teller Machine (ATM), a kiosk, a Point of Sale (POS) system, wearable devices, and the like. Further, the one or more external devices 104 may include, but not limited to, a wearable device, an implantable device, a device present around the human body, and the like. Further, the wearable device may include, but not limited to, earbuds, smart watches, fitness tracker, smart jewellery, Augmented reality (AR) glasses, Virtual reality (VR) headsets, Smart Clothing, Hearing Aids, Medical Wearables, and the like. Further, the implantable device may include medical devices such as, but not limited to, prosthetic devices, cochlear implants, pacemakers, cardiac loop recorders, insulin pumps and the like. Further, the conducting medium 106 may include a human body.

Further, the touchscreen interface 102 may include a capacitive touch sensing layer configured to detect touch input within surface area of the touchscreen interface 102. Further, a one or more electrode is positioned at one or more edges of the capacitive touch sensing layer. Further, the capacitive touch sensing layer may refer to a layer of the touchscreen interface 102 configured to detect a touch. Further, the one or more electrode is configured to maximize a field strength captured during data transmission. Further, the one or more electrodes may include any conducting electrodes such as, but not limited to, zinc electrode, copper electrode, gold electrode, silver electrode, and the like. Further, the electrode may be an additional pin or a metal pad, or the like. Further, the data communication module includes an Electro-Quasistatic Human Body Communication (EQS-HBC) transmitter such as for example, but not limited to, the Wi-R module configured to establish a communication channel with one or more external devices using human body network. Further, the Electro-Quasistatic Human Body Communication (EQS-HBC) transmitter may be configured to send data signals to the one or more external devices through a human body based on the detected touch input. Further, the data signals may include, but not limited to, audio, image, video, transactions in Point of Sale (POS) system, personalized data, and the like. Further, the data communication module may include an EQS-HBC receiver connected to the at least one electrode and a system ground of the touch-based system. The EQS-HBC receiver may be configured to receive data signals from the one or more external devices through the human body based on the detected touch input. Further, the Human Body Communication (EQS-HBC) transmitter and the Human Body Communication (EQS-HBC) receiver may include, but not limited to, a mobile device, a smart phone, a tablet computer, a digital camera, a laptop computer, a desktop computer, an Automated Teller Machine (ATM), a kiosk, a Point of Sale (POS) system, wearable devices, and the like. Further, the system 100 includes a ground plane integrated within the touchscreen interface 102 for acting as a ground electrode. Further, the ground plane may refer to a large metal plane that acts as a reference point for determining electrode in a capacitive touch sensor (as shown in FIG. 1B). The ground plane may be a PCB ground and/or the ground pins or pads of the system.

Figure 2:
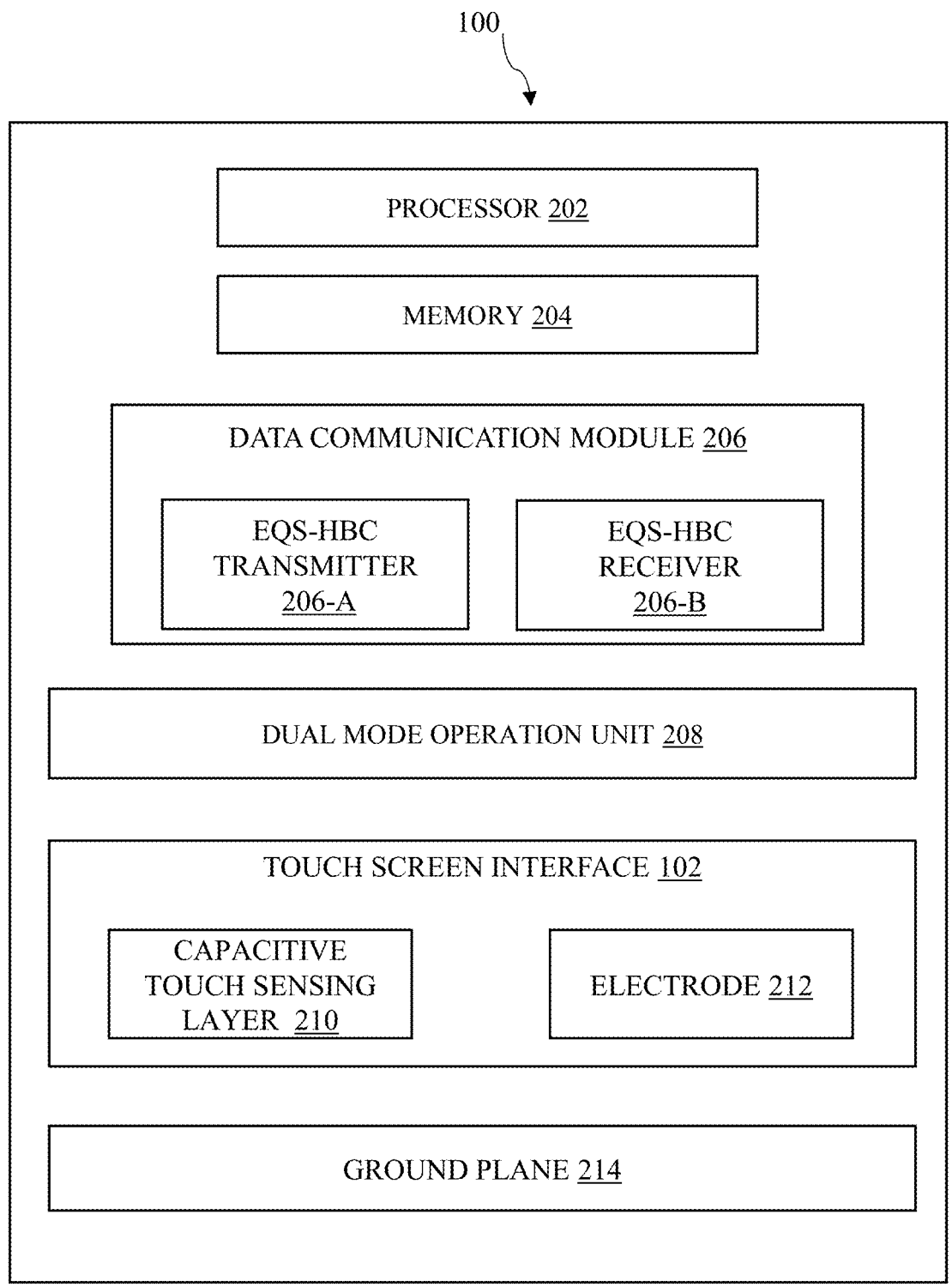
FIG. 2 illustrates a block diagram representation of an exemplary touch-based system for data communication using human body, in accordance with another embodiment of the present disclosure.

FIG. 2 illustrates a block diagram representation of an exemplary touch-based system 100 for data communication using human body, in accordance with another embodiment of the present disclosure. Further, the system 100 may include one or more hardware processors 202, a memory 204 coupled to the one or more hardware processors 202.

The memory 204 may include a plurality of modules in the form of programmable instructions executable by the one or more hardware processors 202. Further, the system 100 may include, but not limited to, a touch screen interface 102, one or more external devices 104, a conducting medium 106, and a ground plane (not shown). Further, the touch screen interface 102 may include a surface capacitive touch screen interface, and the like. Further, the touch screen interface 102 may include, but not limited to, a mobile device, a smart phone, a tablet computer, a digital camera, a laptop computer, a desktop computer, an Automated Teller Machine (ATM), a kiosk, a Point of Sale (POS) system, wearable devices, and the like. Further, the one or more external device 104 may include, but not limited to, a wearable device, an implantable device, a device present around the human body, and the like. Further, the wearable device may include, but not limited to, smart watches, fitness tracker, smart jewellery, Augmented reality (AR) glasses, Virtual reality (VR) headsets, Smart Clothing, Hearing Aids, Medical Wearables, and the like. Further, the conducting medium 106 includes a human body.

Further, the touchscreen interface 102 may include a capacitive touch sensing layer configured to detect touch input within surface area of the touchscreen interface 102. Further, a one or more electrode 212 is positioned at one or more edges of the capacitive touch sensing layer. Further, the one or more electrode 212 may be configured to maximize a field strength captured during data transmission. Further, the one or more electrode 212 may include, but not limited to, an additional pin, a metal pad, and the like. Further, the data communication module 206 may include an Electro-Quasistatic Human Body Communication (EQS-HBC) transmitter 206-A configured to establish a communication channel with one or more external devices using human body network. Further, the communication channel may be formed by using human body as a conducting medium 106. Further, the Electro-Quasistatic Human Body Communication (EQS-HBC) transmitter 206-A may be configured to send data signals to the one or more external devices 104 through a human body based on the detected touch input. Further, the data communication module 206 may include an EQS-HBC receiver 206-B connected to the one or more electrode 212 and a system ground of the touch-based system 100. The EQS-HBC receiver 206-B may be configured to receive data signals from the one or more external devices 104 through the human body based on the detected touch input. Further, the system 100 may include a ground plane 214 integrated within the touchscreen interface for acting as a ground electrode.

Further, the touch-based system 100 may include a signal processing unit (hereinafter referred as Processor 202) communicatively coupled to the data communication module 206. The processor 202 may be configured to process the data received by the EQS-HBC receiver 206-B from the one or more external devices 104. In an example embodiment, the data processing may include for example, signal processing techniques to decode the received data including amplification, clock recovery and the like. Further, the touch-based system 100 may include a dual-mode operation circuit communicatively coupled to the processor 202. The dual mode operation circuit may be configured to determine an operation to be performed on the touch screen interface 102 based on the detected touch input. The operation may be the communication of some data. Further, the dual mode operation circuit may be configured switch between one of a touch sensing mode and a data communication mode based on the determined operation to be performed. Depending upon the application, for example, if an email application is touched on the touchscreen surface, a code may be sent from the touchscreen-based device to the on-body device asking for data to be transferred. In that case the system switches over to communication mode from a touch input mode. Some applications may require data transfer where the communication mode is enabled. In this case, the touchscreen-based device 100 may send a code asking for data to be sent upon which, the transmitter transmits the data through the body to the touchscreen-based device. In case of no data transmission required, the touchscreen-based device acts like a traditional touch-sensing system where the device is used to locate and detect touch. Further, the dual mode operation circuit may be configured to perform at least one of transferring the data to the one or more external devices 104 and sensing the touch inputs based on mode of operation. Further, the touch-based system 100 may include, but not limited to, one or more electrode 212 may be positioned based on the ground plane 214. Further, the one or more electrode 212 may be configured to capture an electric field strength, enhancing received voltage between the ground plane 214 and the one or more electrode 212. The one or more electrode 212 are used to receive data. The small electrodes act as one of the electrodes of the receiver with the other electrode being the system ground. The voltage difference between the system ground and the small electrodes are captured by the receiver to decode the data transmitted. Further, the dual mode operation circuit may be configured to access personalized data of a user for a specific application via the touchscreen interface. Further, Further, the dual mode operation circuit may be configured to interact with the specific application on the touchscreen interface, and simultaneously communicate the personalized data using the human body. For example, the use of an email application can be used to now open a personalized account based upon who is using the touchscreen-based device 100. Further, the dual mode operation circuit may be configured to determine differential voltages measured across each of the at least two electrodes 212 and the ground plane 214. Further, the dual mode operation circuit may be further configured to identify performance of the at least two electrodes 212 based on the determined differential voltages measured. The performance criteria here may be for example, the received voltage. Higher the received voltage, better the receiver.

Further, the dual mode operation circuit may be further configured to determine a best suitable electrode 212 among the at least two electrodes 212 for performing the at least one of transferring the data to the one or more external devices 104 and sensing the touch inputs based on mode of operation. The dual mode operation circuit may be an automated system where the most suitable electrode depends on which region of the touch screen surface is used and where the differential voltage picked up is highest.

Further, the touch-based system 100 may include the EQS-HBC transmitter 206-A and the EQS-HBC receiver 206-B configured to operate at frequency ranges. Further, the touch-based system 100 using EQS-HBC may use frequency range between 1-40 MHz Further, the touch-based system 100 using body resonant peaks may use frequency range between 40-200 MHz Further, the touch-based system 100 using device-dependent resonant modes may use frequency range between 200 MHz to 1 GHz. comprising one of between using EQS-HBC, between 40-200 MHz using body resonant peaks, and between using device-dependent resonant modes.

Figure 3:
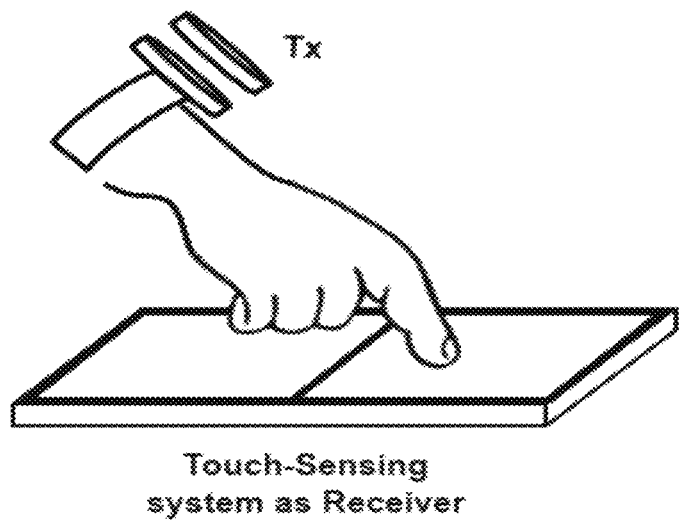
FIG. 3 illustrates a schematic diagram representation of redesigned touch screen interface of an exemplary touch-based system for data communication using human body, in accordance with an embodiment of the present disclosure.
Figure 3:
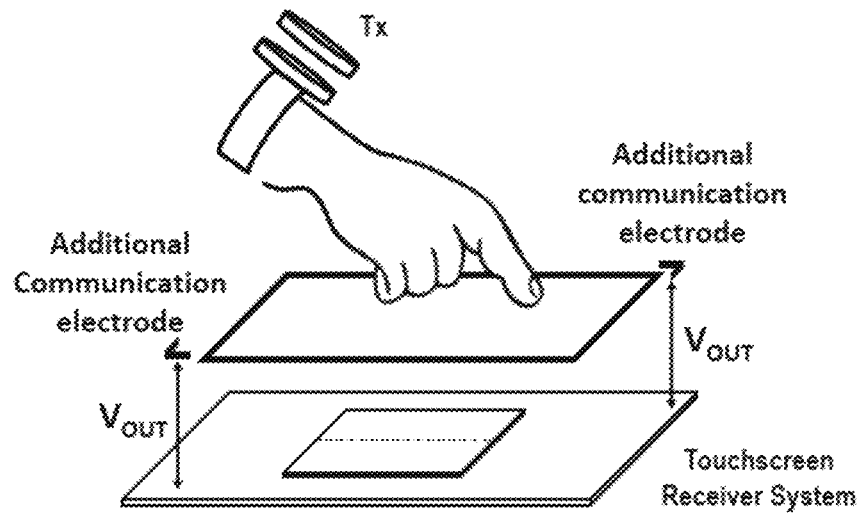

FIG. 3 illustrates a schematic diagram representation of a redesigned touch screen interface 102 of an exemplary touch-based system 100 for data communication using human body, in accordance with an embodiment of the present disclosure. According to FIG. 3, the redesigned touch screen interface 102 may be configured with additional communication electrodes 212 coupled diagonally. Further, the additional communication electrodes 212 may include any conducting electrodes such as, but not limited to, zinc electrode, copper electrode, gold electrode, silver electrode, and the like. Further, the electrode 212 may be an additional pin or a metal pad, or the like. Further, the electrode 212 may be configured to work on principle of a capacitance. The Capacitance is the ability of a conductor or system of conductors to store electrical charge. Further, the touch screen interface 102 may be configured to function on a user touching a screen. The touch of the user disrupts the electrical field near the touched electrode 212, causing a change in capacitance. Further, a touch screen controller (not shown) may be configured to monitor the capacitance of each electrode 212. Further, the controller may determine the location of the touch, based on the change in capacitance specific electrodes 212. Further, the redesigned touch screen interface 102 may be configured to optimize a dual-mode high speed communication. Further, the redesigned touch screen interface 102 may be configured with additional electrodes 212 for low channel loss communication. Further, the redesigned touch screen interface 102 may be configured for dedicated communication and touch sensing system with a low Signal to Noise Ratio (SNR) and high data rates. Further, the Signal to Noise Ratio (SNR) may refer to ratio between the power of signal and the power of noise. A higher ratio indicates a stronger signal relative to the noise, meaning the signal is clearer and easier to detect. Further, the data rate may refer to a speed at which data is transferred from one communicating device to another communicating device. Further, the redesigned touch screen interface 102 may be configured for EQS-HBC based high speed communication.

Figure 4:
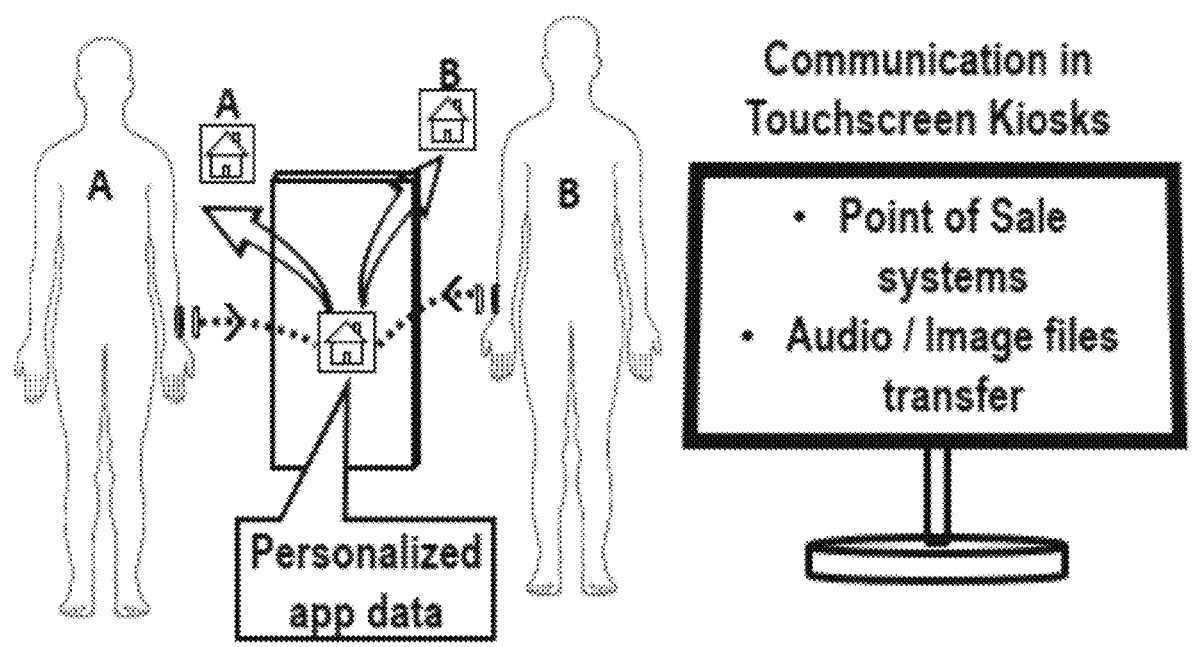
FIG. 4 illustrates a schematic diagram representation of an exemplary touch-based system for data communication using human body depicting usability of a touch screen on a common touch screen based device, in accordance with another embodiment of the present disclosure.

FIG. 4 illustrates a schematic diagram representation of an exemplary touch-based system 100 for data communication using human body depicting a usability of a touch screen on a common touch screen-based device, in accordance with another embodiment of the present disclosure. Further, the usability of the touch screen may include, but not limited to, communicating while detecting and locating a touch, and the like. Further, usability of the touch screen may include simultaneous transfer of user specific data while using any specific application. Further, the user specific data may include, but not limited to, personal information, demographic information, behavioural data, content data, and the like. Further, the personal information may include, but not limited to, name, email address, postal address, phone number, login credentials (username, password), and the like. Further, the demographic information may include, but not limited to, age, gender, location, language preference, and the like. Further, the behavioural data may include, but limited to, search history, browsing history, purchase history, app usage data (time spent, features used), preferences, settings, and the like. Further, the content data may include, but not limited to, documents, audios, photos, videos, social media posts, emails, and the like. Further, the specific application may include, but not limited to, streaming services, social media platforms, e-commerce platforms, learning platforms, and the like.

Figure 5:
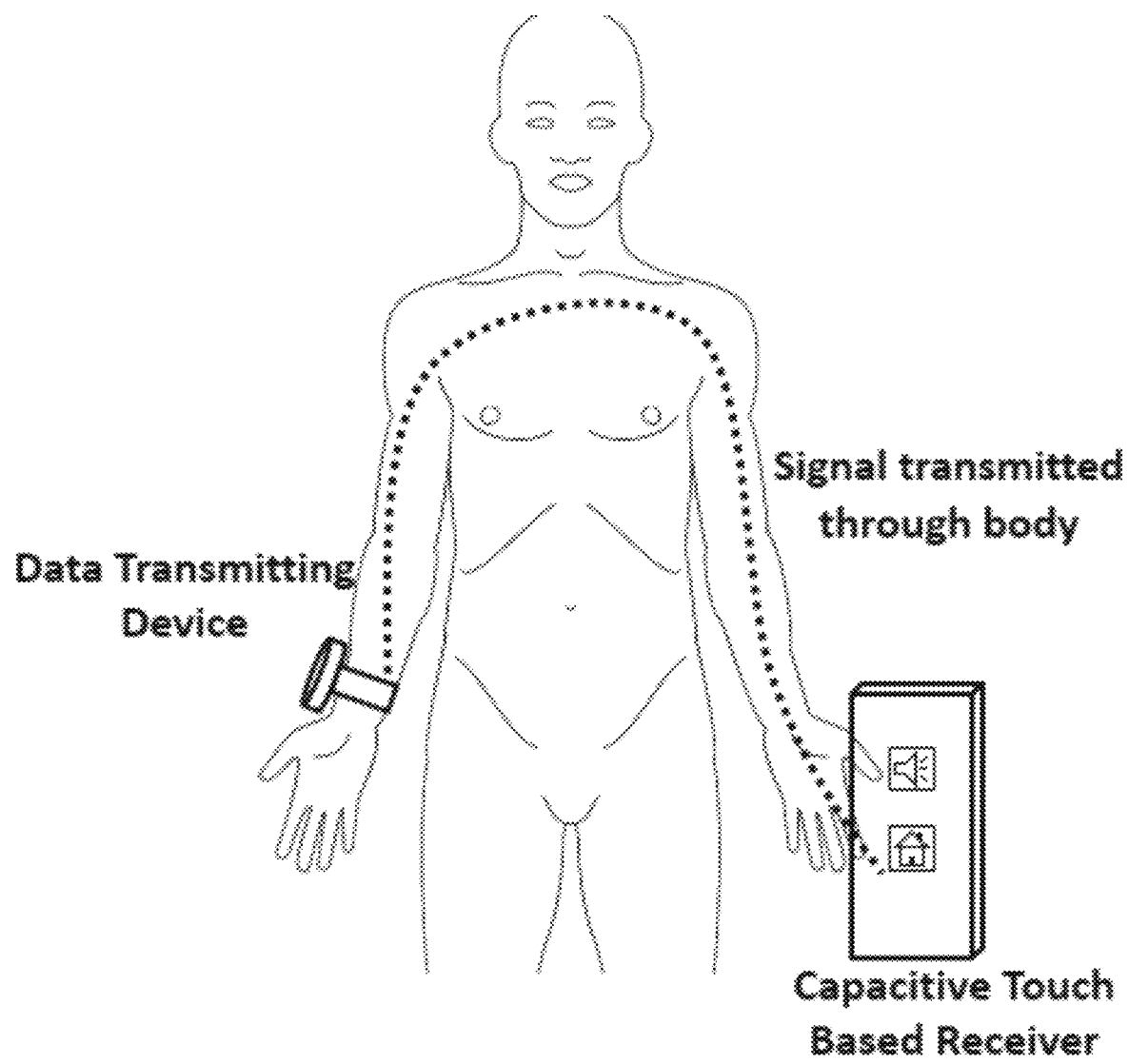
FIG. 5 illustrates a schematic diagram representation of an exemplary touch-based system for data communication using human body, in accordance with another embodiment of the present disclosure.

FIG. 5 illustrates a schematic diagram representation of an exemplary touch-based system 100 for data communication using a human body, in accordance with another embodiment of the present disclosure. According to FIG. 5, an Electro-Quasistatic Human Body Communication (EQS-HBC) may be used for capacitive human body communication. Further, the EQS-HBC may be configured to transmit data through the conductive tissues within the human body. Further, the EQS-HBC may be configured to confine signal within the human body. The confinement of the signal within the body may significantly reduce the risk of unauthorized interception by unintended receivers in the vicinity. Further, to enable high-speed communication through a touchscreen interface 102, the EQS-HBC methodology may transfer data through touch. Further, the Capacitive Electro-Quasistatic Human Body Communication (EQS-HBC) has previously been used to enable data transfer strictly through touch. Further, the Capacitive Electro-Quasistatic Human Body Communication (EQS-HBC) may include, a data transmitting device (hereinafter referred as external device 104), a communication channel (conducting medium 106) formed by the human body, a capacitive touch based receiver. Further, the external device 104 may may include, but not limited to, a wearable device, an implantable device, a device present around the human body, and the like. Further, the wearable device may include, but not limited to, smart watches, fitness tracker, smart jewellery, Augmented reality (AR) glasses, Virtual reality (VR) headsets, Smart Clothing, hearing aids, medical wearables, and the like. Further, the capacitive touch based receiver may include, but not limited to, a mobile device, a smart phone, a tablet computer, a digital camera, a laptop computer, a desktop computer, an Automated Teller Machine (ATM), a kiosk, a Point of Sale (POS) system, general purpose touchscreen devices at restaurants (interactive menu-cards) and supermarkets, wearable devices, and the like.

Figure 6:
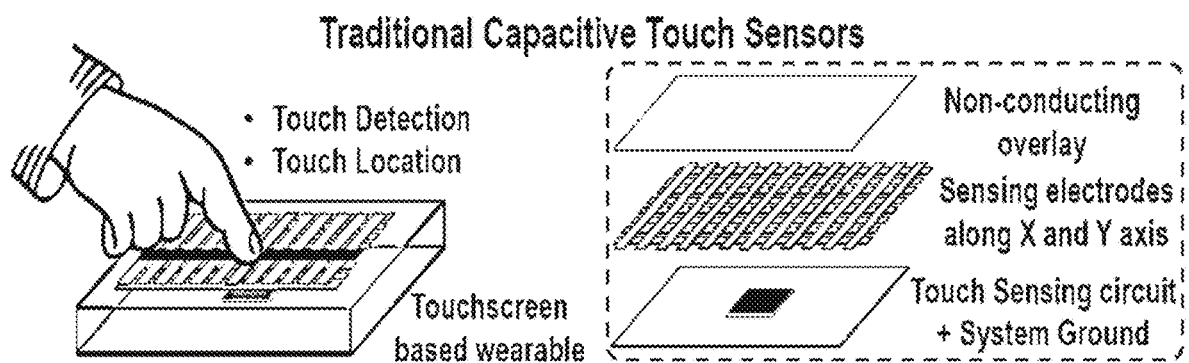
FIG. 6 illustrates a schematic diagram representation of traditional capacitive touch sensors of an exemplary touch-based system for data communication using human body, in accordance with an embodiment of the present disclosure.

FIG. 6 illustrates a schematic diagram representation of traditional capacitive touch sensors of an exemplary touch-based system 100 for data communication using human body, in accordance with an embodiment of the present disclosure. Further, a traditional touch screen interface may include, but not limited to a nonconducting overlay, sensing electrodes along x and y axis, a touch sensing circuit, a system ground and the like. Further, the nonconducting overlay may be configured to protect the underlying sensor components from physical damage (like scratches) and environmental contaminants (like dust or moisture). Further, the nonconducting overlay may be configured to provide a touch surface for users. Further, the nonconducting overlay may be typically made from materials such as, but not limited to, glass, polycarbonate, Polyethylene terephthalate (PET), and the like.

Further, the sensing electrodes along x and y axis may include an arrangement of sensing electrodes in a grid pattern. The grid pattern may refer to vertical and horizontal placement of sensing electrodes in rows and columns. Further, row electrodes run horizontally across the screen, forming the X-axis and column electrodes run vertically down the screen, forming the Y-axis. Further, the touch sensing circuit may be configured to detect a touch on a screen by determining a change in capacitance of one or more electrodes. Further, the traditional capacitive touch sensors may be configured to determine touch detection and touch location. However, such systems may fail to communicate any data to any other device.

Figure 7:
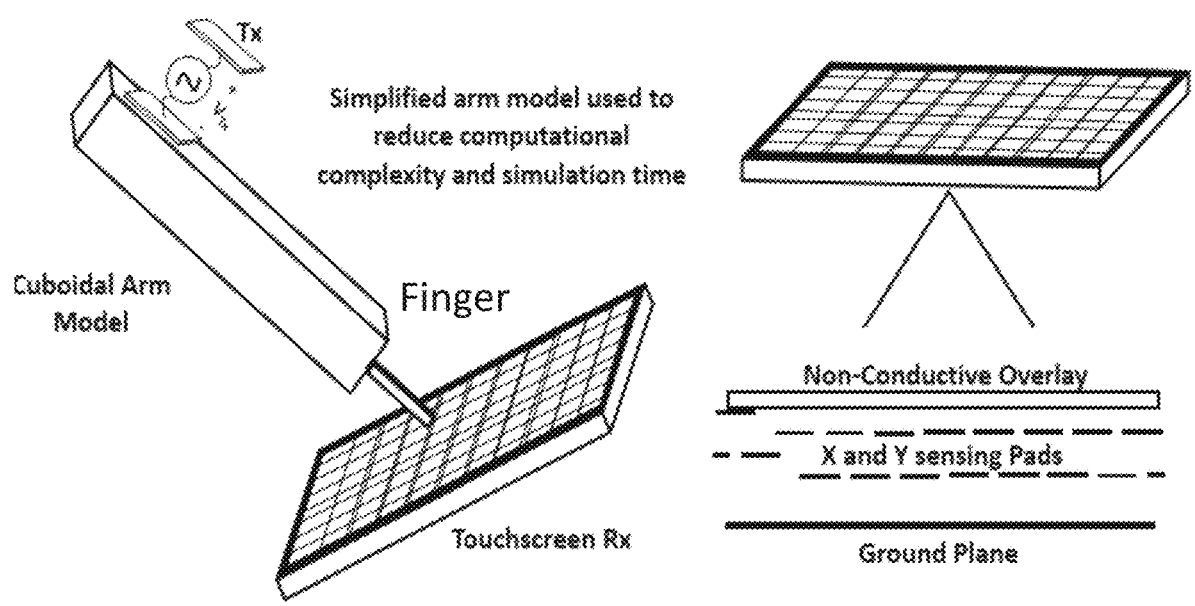
FIG. 7 illustrates a schematic diagram representation of a simulation model for FEM based EM simulations of an exemplary touch-based system for data communication using human body, in accordance with an embodiment of the present disclosure.

FIG. 7 illustrates a schematic diagram representation of a simulation model for FEM based EM simulations of an exemplary touch-based system 100 for data communication using human body, in accordance with an embodiment of the present disclosure. Further, the simulation model may include, but not limited to, a cuboidal arm model with finger, a transmitter communicatively coupled on the proximal end of the cuboidal arm model, a touchscreen receiver, and the like. Further, the cuboidal arm model may be configured with human tissues. Further, the simulation model may include Ansys High-Frequency Structure Simulator (HFSS). The Ansys HFSS is a commercial software program developed by Ansys. Further, the HFSS may be used for simulating the behaviour of electromagnetic (EM) fields in various structures operating at high frequencies. The simulations are performed at frequencies, for example but not limited to, less than 30 MHz The software may use a Finite-Element-Analysis based solver to solve the Maxwell's equations to find the electromagnetic fields around the body and the transmitter and receiver.

Figure 8:
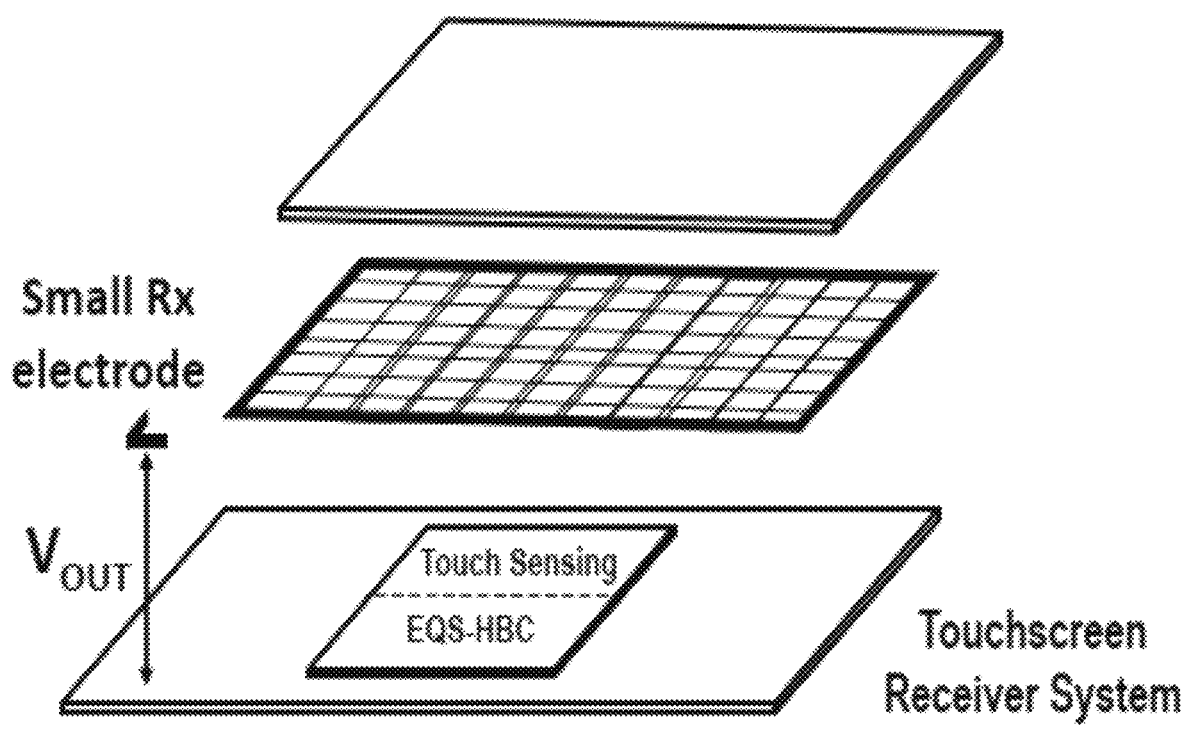
FIG. 8 illustrates a schematic diagram representation of addition of one small additional electrode to the structure of touch screen of an exemplary touch-based system for data communication using human body, in accordance with an embodiment of the present disclosure.

FIG. 8 illustrates a schematic diagram representation of addition of one small additional electrode 212 to the structure of touch screen of an exemplary touch-based system 100 for data communication using human body, in accordance with an embodiment of the present disclosure. The touch-based system 100 may be configured to establish a high-speed communication link through touchscreen interfaces 102. The high-speed communication link may be formed by adding a small additional electrode 212 to the structure of the touchscreen interface 102. The receiver is connected across the ground of the touchscreen system and the small electrode.

Figure 9:
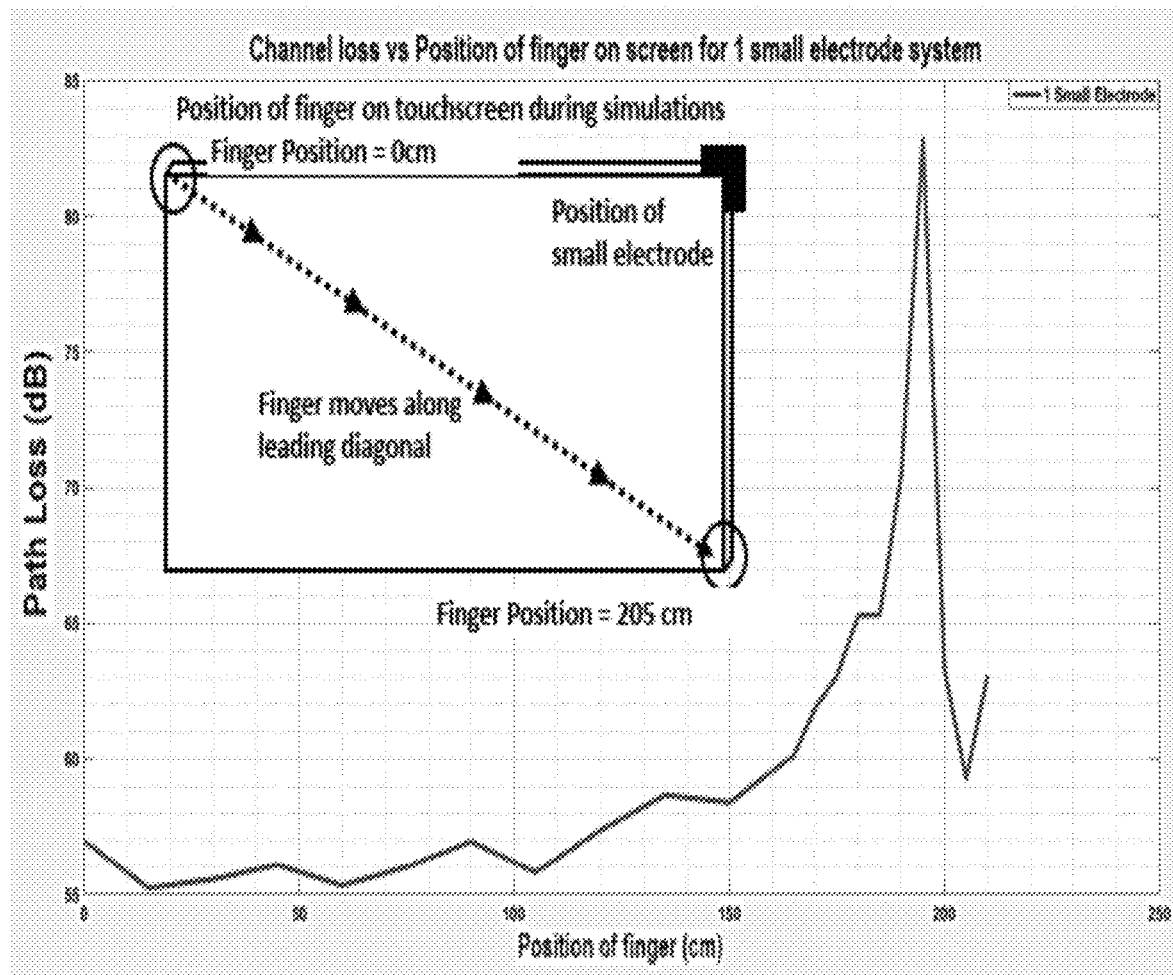
FIG. 9 illustrates a graphical diagram representation of channel loss response on addition of one small additional electrode to the structure of touch screen of an exemplary touch-based system for data communication using human body, in accordance with an embodiment of the present disclosure.

FIG. 9 illustrates a graphical diagram representation of channel loss response on addition of one small additional electrode 212 to the structure of touch screen of an exemplary touch-based system 100 for data communication using human body, in accordance with an embodiment of the present disclosure. According to FIG. 9, the graphical representation depicts the channel loss response Finite Element Method (FEM) based Electromagnetic (EM) analysis for one small electrode 212. Further, the FEM may be a computational tool employed to determine complex scientific problems that may not have readily attainable analytical solutions. Further, the FEM may be used to analyse and optimize performance of electrical devices, transformers, and other electromagnetic components, and the like. Further, the graphical representation depicts a gradual increase in channel loss with a diagonal movement of finger from a position at 0 cm to a position at 205 cm. Further, the channel loss is observed maximum when the finger is positioned at 180 cm. Thus, with a single small electrode, the channel loss is sub optimal with high channel loss regions on the touch screen surface.

Figure 10:
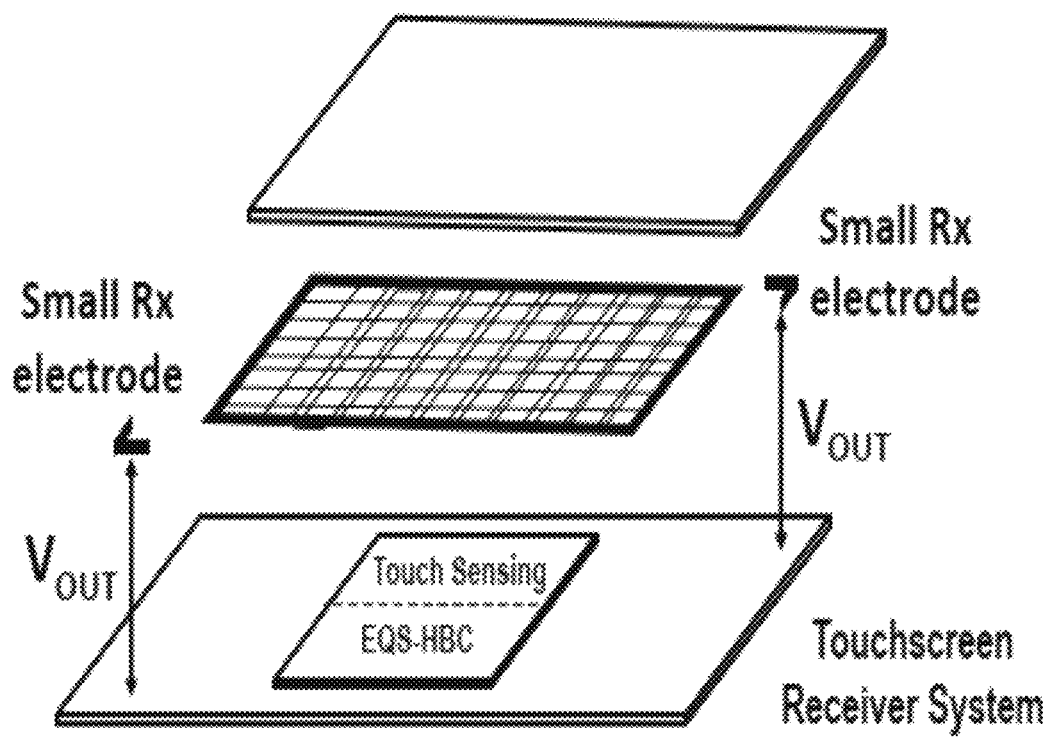
FIG. 10 illustrates a schematic diagram representation of addition of two small additional electrodes to the structure of touch screen of an exemplary touch-based system for data communication using human body, in accordance with an embodiment of the present disclosure.

FIG. 10 illustrates a schematic diagram representation of addition of two small additional electrodes 212 to the structure of touch screen of an exemplary touch-based system 100 for data communication using human body, in accordance with an embodiment of the present disclosure. According to FIG. 10, a channel loss along a movement of a finger may be optimized by addition of two small electrodes 212. Further, a position of small electrode is such that the maximum field strength is captured to increase the received voltage between ground plane of the touchscreen system and the small electrode 212. The small electrodes 212 may be placed on the high-electric field positions which is typically on the edges and the corners of the system ground. The field strength is maximum around sharp edges and corners where the charge density is higher. For example, the field strength is high for a rectangular surface near the 4 corners. Further, a redesign of the touchscreen interface may be performed such that the structure of touchscreen does not change significantly. Further, an additional parasitic capacitance is reduced. The additional parasitic capacitance between any additional electrode and the touch sensing system is minimized for small electrodes which ensures that the touch sensing systems sensitivity is not compromised. Further, the reduction of the parasitic capacitance may not affect the touch sensing sensitivity. Further, the small additional electrodes 212 may be introduced in the touchscreen interface 102. Further, the use of two small electrodes 212 on touchscreen interface to receive data for a low channel loss communication channel resulting in high Signal-to-Noise Ratio (SNR) which leads to high data rate communication. The two small electrode system ensures that the path loss is stable and minimal for the entire touchscreen interface surface. Further, use of EQS-HBC receiver across redesigned touchscreen interface 102 enables high-speed data transfer. Further, the addition of two small electrode 212 may provide the optimal channel loss for all positions of touch detected on a touchscreen interface 102 with a low channel loss observed for the entire touchscreen interface 102. The low path loss is due to high signal coupling to the larger ground plane in the system and minimal signal coupling to the smaller additional electrodes. This creates a large differential voltage which can be picked up by the receiver ensuring low path loss.

Figure 11:
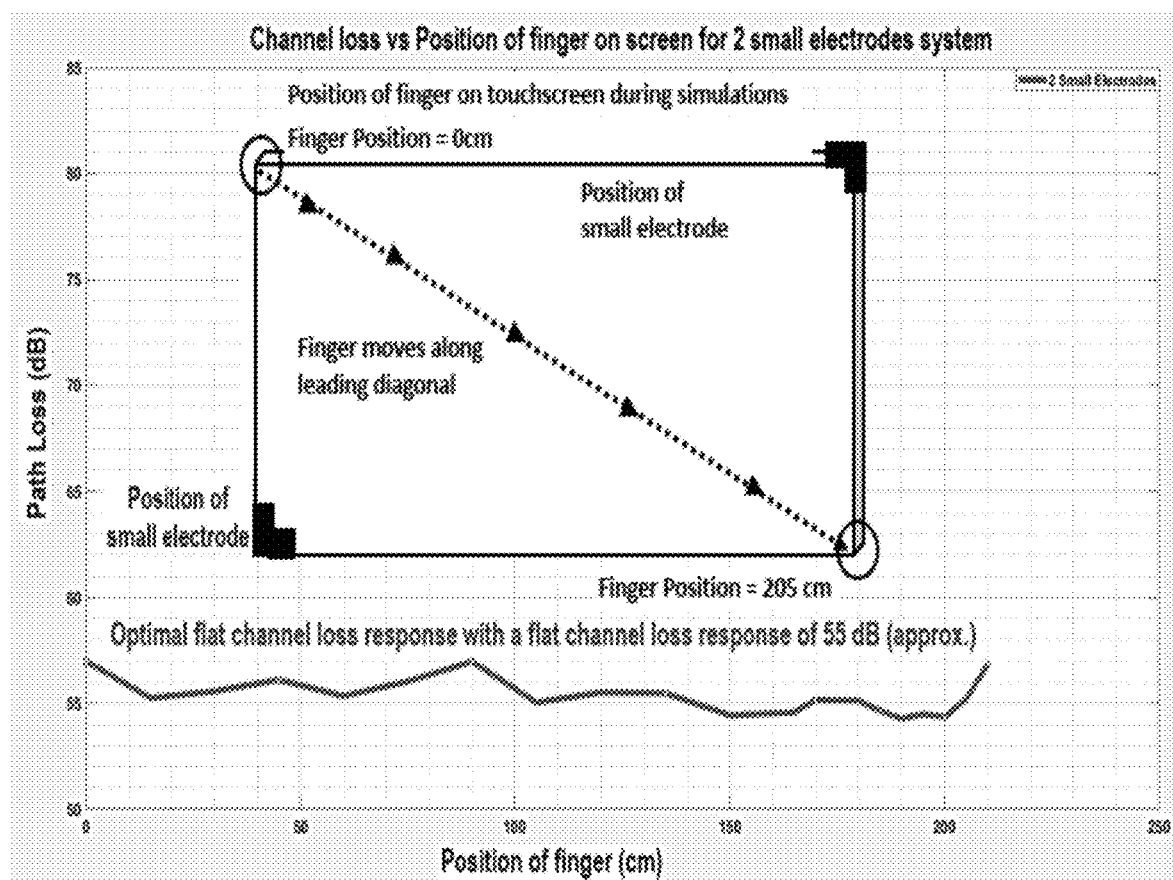
FIG. 11 illustrates a graphical diagram representation of channel loss response on addition of two small additional electrodes to the structure of touch screen of an exemplary touch-based system for data communication using human body, in accordance with an embodiment of the present disclosure.

FIG. 11 illustrates a graphical diagram representation of channel loss response on addition of two small additional electrodes 212 to the structure of touch screen of an exemplary touch-based system 100 for data communication using human body, in accordance with an embodiment of the present disclosure. Further, the graphical representation may also depict a position of finger on touchscreen during simulation. According to FIG. 11 the graphical representation depicts the channel loss response Finite Element Method (FEM) based Electromagnetic (EM) analysis for two small electrode 212. Further, the FEM may be a computational tool employed to determine complex scientific problems that may not have readily attainable analytical solutions. Further, the FEM may be used to analyse and optimize performance of electrical devices, transformers, and other electromagnetic components, and the like. Further, the graphical representation depicts flat channel loss of about 55 dB for a position of a finger at 0 cm to the position of the finger at 205 cm. The flat channel loss ensures that a low channel loss communication can be enabled for wherever the finger comes in contact with the touchscreen.

Figure 12:
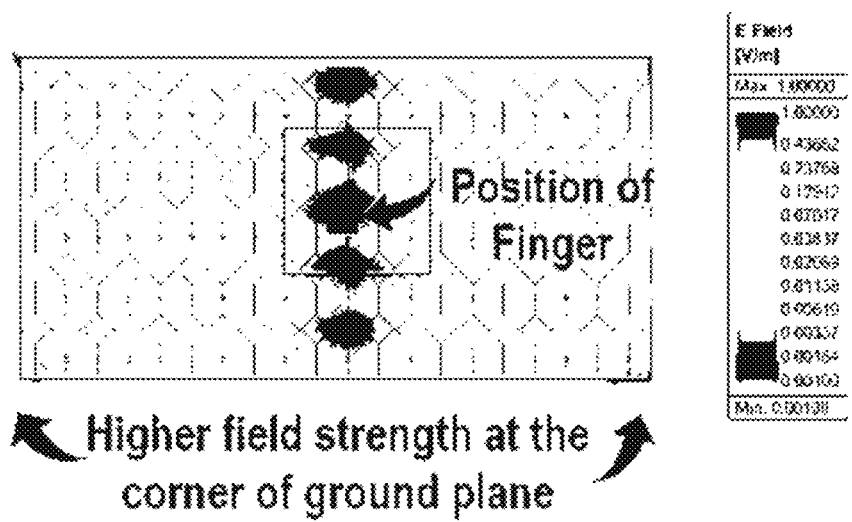
FIG. 12 illustrates a schematic diagram representation of electric field plot magnitude on ground plane of touch screen of an exemplary touch-based system for data communication using human body, in accordance with an embodiment of the present disclosure.

FIG. 12 illustrates a schematic diagram representation of electric field plot magnitude on ground plane of touch screen of an exemplary touch-based system 100 for data communication using human body, in accordance with an embodiment of the present disclosure. Further, an optimal placement of the small electrodes 212 may depend on the structure of a ground plane 214 for the touch sensing setup. For example, in a rectangular ground plane system, the small electrodes 212 are placed close to the corners or the vertices of the rectangle to ensure highest received voltage.

Further, the ground plane 214 may be a rectangular structure. Further, vertices of the ground plane 214 are the positions where the highest field strength is observed due to a higher charge density accumulating at the corners. The charge density is higher in sharper edges for any structure. Further, the small electrode 212 may be positioned to capture the highest electric field strength. Further, for a ground plane of different shape, the maximum field strength maybe in different positions and the smaller ground plane 214 must be positioned accordingly. For example, for a circular ground plane, the edges will have a higher field strength and thus the small electrodes must be placed around the circular edge. Further, the small ground plane 214 in the FEM simulations is of 1 $mm^2$ area.

FIG. 13 illustrates a process flow diagram of an exemplary method 400 for communicating data between devices and a touch-based system 100 using a human body, in accordance with an embodiment of the present disclosure. As illustrated in FIG. 13, the following steps may be implemented. At step 1302, the method 1300 includes detecting, by a touchscreen interface 102 of a touch-based system 100, a touch input within surface area of the touchscreen interface 102. At step 1304, the method 1300 includes capturing, by at least one electrode 212 of the touch-based system 100, electric field strength produced at the surface area of the touchscreen interface upon detecting the touch input. At step 1306, the method 1300 includes establishing, by an Electro-Quasistatic Human Body Communication (EQS-HBC) system of the touch-based system 100, a communication channel with one or more external devices 104 using human body network. At step 1308, the method 1300 includes transferring, by the EQS-HBC system of the touch-based system 100, data signals between one or more external devices 104 and the touch-based system 100 through a human body network based on the detected touch input.

Further, the method 1300 includes processing, by a signal processing unit (hereinafter referred as processor 202) of the touch-based system, the data signals received by the EQS-HBC system from the one or more external devices 104. Further, the method 1300 includes determining, by a dual-mode operation circuit of the touch-based system 100, an operation to be performed on the touch screen interface 102 based on the detected touch input. Further, the method 1300 includes switching, by the dual-mode operation circuit of the touch-based system 100, between one of a touch sensing mode and a data communication mode based on the determined operation to be performed. Further, the method 1300 includes performing, by the dual-mode operation circuit of the touch-based system, at least one of transferring the data to the one or more external devices and sensing the touch inputs based on mode of operation. Further, in transferring the data signals between one or more external devices and the touch-based system 100, the method 1300 includes signal communication between frequency range of 1-40 MHz using EQS-HBC. Further, in transferring the data signals between one or more external devices and the touch-based system 100, the method 1300 includes signal communication between frequency range of 40-200 MHz using body resonant peaks.

Further, in transferring the data signals between one or more external devices and the touch-based system 100, the method 1300 includes signal communication between frequency range of 200 MHz to 1 GHz using device-dependent resonant modes. Further, the data signals may correspond to user-specific data associated with the detected touch input. Further, in determining, by the dual-mode operation circuit of the touch-based system, the method 1300 includes measuring differential voltages across each of the at least two electrodes and the ground plane. Further, the method 1300 includes identifying, by the dual-mode operation circuit of the touch-based system, performance of the at least two electrodes based on the determined differential voltages measured. Further, the method 1300 includes determining, by the dual-mode operation circuit of the touch-based system 100, a best suitable electrode among at least two electrodes for performing the at least one of transferring the data to the one or more external devices 104 and sensing the touch inputs based on mode of operation. Further, the method 1300 includes accessing, by the dual-mode operation circuit of the touch-based system 100, personalized data of a user for a specific application via the touchscreen interface 102. Further, the method 400 includes interacting, by the dual-mode operation circuit of the touch-based system 100, with the specific application on the touchscreen interface 102, and simultaneously communicate the personalized data using the human body.

The written description describes the subject matter herein to enable any person skilled in the art to make and use the embodiments. The scope of the subject matter embodiments is defined by the claims and may include other modifications that occur to those skilled in the art. Such other modifications are intended to be within the scope of the claims if they have similar elements that do not differ from the literal language of the claims or if they include equivalent elements with insubstantial differences from the literal language of the claims.

The embodiments herein can include hardware and software elements. The embodiments that are implemented in software include but are not limited to, firmware, resident software, microcode, etc. The functions performed by various modules described herein may be implemented in other modules or combinations of other modules. For the purposes of this description, a computer-usable or computer readable medium can be any apparatus that can include, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid-state memory, magnetic tape, a removable computer diskette, a random-access memory (RAM), a read-only memory (ROM), a rigid magnetic disk and an optical disk. Current examples of optical disks include compact disk-read only memory (CD-ROM), compact disk-read/write (CD-R/W) and DVD.

Input/output (I/O) devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters.

A representative hardware environment for practicing the embodiments may include a hardware configuration of an information handling/computer system in accordance with the embodiments herein. The system herein includes at least one processor or central processing unit (CPU). The CPUs are interconnected via system bus 208 to various devices such as a random-access memory (RAM), read-only memory (ROM), and an input/output (I/O) adapter. The I/O adapter can connect to peripheral devices, such as disk units and tape drives, or other program storage devices that are readable by the system. The system can read the inventive instructions on the program storage devices and follow these instructions to execute the methodology of the embodiments herein.

The system further includes a user interface adapter that connects a keyboard, mouse, speaker, microphone, and/or other user interface devices such as a touch screen device (not shown) to the bus to gather user input. Additionally, a communication adapter connects the bus to a data processing network, and a display adapter connects the bus to a display device which may be embodied as an output device such as a monitor, printer, or transmitter, for example.

A description of an embodiment with several components in communication with each other does not imply that all such components are required. On the contrary, a variety of optional components are described to illustrate the wide variety of possible embodiments of the invention. When a single device or article is described herein, it will be apparent that more than one device/article (whether or not they cooperate) may be used in place of a single device/article. Similarly, where more than one device or article is described herein (whether or not they cooperate), it will be apparent that a single device/article may be used in place of the more than one device or article, or a different number of devices/articles may be used instead of the shown number of devices or programs. The functionality and/or the features of a device may be alternatively embodied by one or more other devices which are not explicitly described as having such functionality/features. Thus, other embodiments of the invention need not include the device itself.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments. Also, the words "comprising," "having," "containing," and "including," and other similar forms are intended to be equivalent in meaning and be open-ended in that an item or items following any one of these words is not meant to be an exhaustive listing of such item or items or meant to be limited to only the listed item or items. It must also be noted that as used herein and in the appended claims, the singular forms "a," "an," and "the" include plural references unless the context clearly dictates otherwise.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based here on. Accordingly, the embodiments of the present invention are intended to be illustrative, but not limiting, of the scope of the invention, which is set forth in the following claims.

We claim:

1. A touch-based system for data communication using human body comprising:
   a touchscreen interface, comprising:
      a capacitive touch sensing layer configured to detect touch input within surface area of the touchscreen interface;
      at least one electrode positioned at one or more edges of the capacitive touch sensing layer, wherein the at least one electrode is configured to maximize a field strength captured during data transmission;
      wherein the at least one electrode is positioned based on a ground plane and wherein the at least one electrode is configured to capture an electric field strength, enhancing received voltage between the ground plane and the at least one electrode; and at least two electrodes positioned each at diagonal edges of the capacitive touch sensing layer;

a data communication module communicatively coupled to the touchscreen interface comprising:

an Electro-Quasistatic Human Body Communication (EQS-HBC) transmitter configured to establish a communication channel with one or more external devices using human body network; and send data signals to the one or more external devices through a human body based on the detected touch input; and an EQS-HBC receiver connected to the at least one electrode and a system ground of the touch-based system, wherein the EQS-HBC receiver is configured to receive data signals from the one or more external devices through the human body based on the detected touch input;

the ground plane integrated within the touchscreen interface for acting as a ground electrode; and a dual-mode operation circuit configured to determine differential voltages measured across each of the at least two electrodes and the ground plane.

2. The touch-based system of claim 1, further comprising:
a signal processing unit communicatively coupled to the data communication module, wherein the signal processing unit is configured to process the data received by the EQS-HBC receiver from the one or more external devices.

3. The touch-based system of claim 1, further comprising:
the dual-mode operation circuit communicatively coupled to the signal processing unit, wherein the dual mode operation circuit is configured to:
determine an operation to be performed on the touch screen interface based on the detected touch input;
switch between one of a touch sensing mode and a data communication mode based on the determined operation to be performed; and
perform at least one of transferring the data to the one or more external devices and sensing the touch inputs based on mode of operation.

4. The touch-based system of claim 1, wherein the EQS-HBC transmitter and the EQS-HBC receiver are configured to operate at frequency ranges comprising one of between 1-40 MHz using EQS-HBC, between 40-200 MHz using body resonant peaks, and between 200 MHz to 1 GHz using device-dependent resonant modes.

5. The touch-based system of claim 1, wherein the data signals correspond to user-specific data associated with the detected touch input.

6. The touch-based system of claim 3, wherein the dual mode operation circuit is further configured to:
access personalized data of a user for a specific application via the touchscreen interface; and
interact with the specific application on the touchscreen interface, and simultaneously communicate the personalized data using the human body.

7. The touch-based system of claim 3, wherein the dual mode operation circuit is further configured to:
identify performance of the at least two electrodes based on the determined differential voltages measured; and
determine a best suitable electrode among the at least two electrodes for performing the at least one of transferring the data to the one or more external devices and sensing the touch inputs based on mode of operation.

8. The touch-based system of claim 1, wherein the placement of the at least one electrode depends on structure of the ground plane.

9. The touch-based system of claim 1, wherein the one or more external devices comprises one of wearable devices, implantable devices and devices present around the human body.

10. A method for communicating data between devices and a touch based system using a human body, wherein the method comprises:
detecting, by a touchscreen interface of the touch based system, a touch input within surface area of the touchscreen interface;
capturing, by at least one electrode of the touch based system, electric field strength produced at the surface area of the touchscreen interface upon detecting the touch input, wherein the at least one electrode is positioned based on a ground plane and wherein the at least one electrode is configured to capture an electric field strength, enhancing received voltage between the ground plane and the at least one electrode, and wherein the touch based system comprises at least two electrodes positioned each at diagonal edges of the capacitive touch sensing layer;
determining, by a dual-mode operation circuit of the touch based system, differential voltages measured across each of the at least two electrodes and the ground plane;
establishing, by a Electro-Quasistatic Human Body Communication (EQS-HBC) system of the touch based system, a communication channel with one or more external devices using human body network; and
transferring, by the EQS-HBC system of the touch based system, data signals between one or more external devices and the touch-based system through the human body network based on the detected touch input.

11. The method of claim 10, further comprising:
processing, by a signal processing unit of the touch based system, the data signals received by the EQS-HBC system from the one or more external devices.

12. The method of claim 10, further comprising:
determining, by the dual-mode operation circuit of the touch based system, an operation to be performed on the touch screen interface based on the detected touch input;
switching, by the dual-mode operation circuit of the touch based system, between one of a touch sensing mode and a data communication mode based on the determined operation to be performed; and
performing, by the dual-mode operation circuit of the touch based system, at least one of transferring the data to the one or more external devices and sensing the touch inputs based on mode of operation.

13. The method of claim 10, wherein the data signals are communicated in frequency ranges comprising one of between 1-40 MHz using EQS-HBC, between 40-200 MHz using body resonant peaks, and between 200 MHz to 1 GHz using device-dependent resonant modes.

14. The method of claim 10, wherein the data signals correspond to user-specific data associated with the detected touch input.

15. The method of claim 12, further comprising:
accessing, by the dual-mode operation circuit of the touch based system, personalized data of a user for a specific application via the touchscreen interface; and
interacting, by the dual-mode operation circuit of the touch based system, with the specific application on the touchscreen interface, and simultaneously communicate the personalized data using the human body.

16. The method of claim 12, further comprising:
identifying, by the dual-mode operation circuit of the touch based system, performance of the at least two electrodes based on the determined differential voltages measured; and
determining, by the dual-mode operation circuit of the touch based system, a best suitable electrode among at least two electrodes for performing the at least one of transferring the data to the one or more external devices and sensing the touch inputs based on mode of operation.

17. A non-transitory computer-readable medium comprising machine-readable instructions that are executable by a processor to:
detect a touch input within surface area of a touchscreen interface;
capture electric field strength produced at the surface area of the touchscreen interface upon detecting the touch input;
adjust a received voltage between a ground plane and at least one electrode, wherein the at least one electrode is positioned at one or more edges of a capacitive touch sensing layer of the touchscreen interface;
determine differential voltages measured across each of the at least one electrode and the ground plane;
establish a communication channel with one or more external devices using a human body network; and
transfer data signals between one or more external devices and the touch-based system through the human body network based on the detected touch input.

18. The non-transitory computer-readable medium of claim 17, further causes the processor to:
determine an operation to be performed on the touch screen interface based on the detected touch input;
switch between one of a touch sensing mode and a data communication mode based on the determined operation to be performed; and
perform at least one of transferring the data to the one or more external devices and sensing the touch inputs based on mode of operation.

* * * * *